(12) United States Patent
Hannu et al.

(10) Patent No.: US 8,948,106 B2
(45) Date of Patent: Feb. 3, 2015

(54) CONTROLLING TELECOMMUNICATIONS CHANNEL SWITCHING

(75) Inventors: Hans Hannu, Luleå (SE); Jan Christoffersson, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 72 days.

(21) Appl. No.: 13/322,982

(22) PCT Filed: Nov. 25, 2011

(86) PCT No.: PCT/SE2011/051428
§ 371 (c)(1),
(2), (4) Date: Apr. 12, 2012

(87) PCT Pub. No.: WO2013/077792
PCT Pub. Date: May 30, 2013

(65) Prior Publication Data
US 2013/0089038 A1    Apr. 11, 2013

(51) Int. Cl.
*H04W 4/00*    (2009.01)

(52) U.S. Cl.
USPC .......................... 370/329; 370/252; 370/311

(58) Field of Classification Search
USPC ........................................ 370/252, 311, 329
See application file for complete search history.

(56) References Cited

U.S. PATENT DOCUMENTS

| | | | |
|---|---|---|---|
| 6,347,091 B1 | 2/2002 | Wallentin et al. | |
| 7,680,478 B2 | 3/2010 | Willars et al. | |
| 2004/0017795 A1 | 1/2004 | Abraham et al. | |
| 2006/0052137 A1 | 3/2006 | Randall et al. | |
| 2007/0259637 A1 | 11/2007 | Basir et al. | |
| 2008/0267083 A1* | 10/2008 | MacCormick et al. | 370/252 |
| 2010/0302957 A1 | 12/2010 | Ketheesan et al. | |
| 2012/0122405 A1* | 5/2012 | Gerber et al. | 455/67.11 |
| 2013/0088962 A1 | 4/2013 | Stjernholm et al. | |

FOREIGN PATENT DOCUMENTS

| | | |
|---|---|---|
| EP | 1 798 998 A1 | 6/2007 |
| GB | 2 398 968 A | 9/2004 |
| JP | 2007-214711 A | 8/2007 |

(Continued)

OTHER PUBLICATIONS

Ramirez, Daniel Crespo, "Smartphone Traffic Patterns", Jul. 17, 2011, KTH Invormation and Communication Technology.*

(Continued)

*Primary Examiner* — Jason Mattis
(74) *Attorney, Agent, or Firm* — Nixon & Vanderhye, P.C.

(57) ABSTRACT

A node (26) of a radio access network (24) and method of operating such node controls transitions between radio resource control states for a wireless terminal (30). In an example embodiment and mode the method comprises: (1) upon completion of a data activity, making a prediction of a data transmission parameter; (2) making an assessment regarding probable accuracy of the prediction; and (3) using the assessment to make a determination whether or not to implement a radio resource control state switch (the "state switch"). The data transmission parameter may be a different parameter in respective differing example embodiments. In one example embodiment and mode the data transmission parameter comprises inter-arrival time between bursts of data activity. In another example embodiment and mode the data transmission parameter comprises burst size of a burst of data activity.

31 Claims, 12 Drawing Sheets

(56) References Cited

FOREIGN PATENT DOCUMENTS

| WO | 02/39775 A1 | 5/2002 |
| WO | 03/096730 A1 | 11/2003 |
| WO | 2007/053106 A1 | 5/2007 |
| WO | 2010/047630 A1 | 4/2010 |

OTHER PUBLICATIONS

3GPP TS 25.331 V10.4.0 (Jun. 2011), 3rd Generation Partnership Project; Technical Specification Group Radio Access Network; Radio Resource Control (RRC); Protocol specification (Release 10).
Office Action mailed Sep. 11, 2013 in U.S. Appl. No. 13/341,885.
Liers et al, "UMTS Data Capacity Improvements Employing Dynamic RRC Timeouts", IEEE 16$^{th}$ International Symposium on Personal, Indoor and Mobile Radio Communications, 2005, pp. 2186-2190.
Renesas Mobile Europe Ltd, et al., "UE Battery Life Improvements and Signalling Reduction," 3GPP TSG-RAN WGS Meeting #75bis; R2-115322; Oct. 2011.
European Search Report issued in Application No. 12187252 dated Feb. 6, 2013.
Notice of Allowance mailed Jan. 17, 2014 in U.S. Appl. No. 13/341,885.
U.S. Appl. No. 61/544,205, filed Oct. 6, 2011, entitled "Dynamic Radio Resource Control State Switching".

* cited by examiner

CONTROLLING TELECOMMUNICATIONS CHANNEL SWITCHING

This application is the U.S. national phase of International Application No. PCT/SE2011/051428 filed 25 Nov. 2011 which designated the U.S. the entire contents of which is hereby incorporated by reference, and also incorporates by reference.

TECHNICAL FIELD

This invention pertains to telecommunications, and particularly to method and apparatus for governing the transitioning between radio resource control (RRC) states or channels for a wireless terminal or user equipment unit (UE).

BACKGROUND

In a typical cellular radio system, wireless terminals, also known as mobile stations and/or user equipment units (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcasted in the cell. Another identity identifying the cell is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity.

Mobile telecommunications systems are normally statically configured with a parameter set defining the behavior of the system. The systems are based on standards which define radio bearers to carry traffic with different characteristics, e.g. speech, streaming video, or packet data. Standards such as the 3GPP standards referenced above also define different UE/RRC states. See, for example, 3GPP TS 25.331 V10.4.0 (2011-06), 3rd Generation Partnership Project; Technical Specification Group Radio Access Network; Radio Resource Control (RRC); Protocol specification (Release 10), incorporated herein by reference, which describes states such as CELL_DCH state, CELL_FACH state, CELL_PCH state, URA_PCH state, and the Idle state URA_PCH state. These names of these states are understood in view of the following channels/areas: Dedicated Channel (DCH); Forward Access Channel (FACH); Random Access Channel (RACH); UTRAN registration area (URA_PCH).

For each wireless terminal in the connected mode, a node of the radio access network, such as a radio network controller (RNC) node, determines in which of these states the wireless terminal operates. Whichever of the UE/RRC states a wireless terminal currently is in has consequences which affect, e.g., the UE battery consumption and the resource consumption in the mobile network.

For UTRAN (WCDMA) in particular the 3GPP standard defines the Radio Access Bearer (RAB) to carry the services, where the Interactive RAB is specified for best effort traffic. The 3GPP standard also defines UE/RRC states such as CELL_DCH, CELL_FACH, CELL_PCH, and URA_PCH, mentioned above.

Packet data services have escalated, particularly with the introduction of wireless terminals in the form of devices such as Smartphones, and with personal computers (PCs) now widely participating in the mobile networks. Most of the packet traffic is based on the internet protocol (IP), e.g., internet services, and is normally treated as best effort traffic in the mobile network. Internet services are of many types and different characteristics, e.g. web browsing, chat, email, file sharing, and video streaming Within an Internet Protocol (IP) flow there are typically times of activity and times of inactivity. Periods of activity will be separated by times of inactivity of different length. Within the IP flow, a burst may for example be defined by IP packets arriving with a maximum inter-arrival time ($IAT_{max}$). The Idle Time Between bursts (ITB) is defined as the time between the last packet in one burst and the first packet of the next. A burst, inter-arrival time (IAT), and Idle Time Between bursts (ITB) are illustrated in FIG. 2.

As mentioned above, a radio access network node such as the radio network controller keeps track of the UE/RRC state in which a wireless terminal is currently operating and also governs the transition of the wireless terminal between UE/RRC states. In other words, the radio network controller determines when a wireless terminal should transition from one UE/RRC state to another state. Parameters to govern the transition between UE/RRC states are normally timer based. FIG. 3 generally depicts that, when switching to a higher state, a wireless terminal may be required to transition from one UE/RRC state to another UE/RRC state upon expiration of a timer. The timer may be activated or initiated by some UE-related network activity, e.g. forwarding of an IP packet to/from the UE. The timer may expire due to some UE-related inactivity, e.g., no IP packet forwarded to/from the UE. Expiration of the timer may prompt the transition from one UE/RRC state to another UE/RRC state. Transfer to a state of higher activity is normally transmission-triggered, e.g., filling of a buffer.

High Speed Packet Access (HSPA) generally employs two mobile telephony protocols, High Speed Downlink Packet Access (HSDPA) and High Speed Uplink Packet Access (HSUPA), and as such extends and improves the performance of existing WCDMA protocols. With HSPA it is now possible to provide mobile broadband since the peak bit rates reach up to 42 Mbps (3GPP R8) in downlink, and 11 Mbps (3GPP R8) in uplink. For 3GPP R9 the peak rates are doubled. Thus, HSPA may be seen as a complement and replacement to other broad band access such as Asymmetric Digital Subscriber Line (ADSL).

As mentioned above and illustrated in FIG. 1, the Idle, Cell_DCH, Cell_FACH, URA_PCH, and Cell_PCH are the five RRC protocol states. Data transfer between the terminal and the network is only possible in Cell_FACH and Cell- _DCH states. The Cell_DCH state is characterized by dedicated channels in both the uplink and the downlink. This corresponds to continuous transmission and reception and has the highest battery consumption. The Cell_FACH state does not use dedicated channels and thus allows lower battery consumption, at the expense of a lower uplink and downlink throughput. Thus, in addition to showing the RRC states, FIG. 1 also shows serves as an example state transition diagram. As understood from FIG. 1, the system typically does state transition due to amount of data in the RLC send buffers and due to the length of transmission inactivity.

In the example state transition diagram of FIG. 1, down-switch from CELL_DCH is based on inactivity timers. These may be set differently depending on traffic types, based on RNC load, with respect to UE power consumption or even specifically per user. A different approach is to use adaptive channel switching by predicting the time until the next data activity, i.e. to predict the inter-arrival time (IAT) between data bursts. Examples of adaptive channel switching are described, e.g., in U.S. provisional patent application 61/544205, filed Oct. 6, 2011, entitled "DYNAMIC "RADIO RESOURCE CONTROL STATE SWITCHING, and incorporated herein by reference in its entirety.

There is a difference in processor load for the RNC associated with staying in the different states and to switch between the states. The load of residing in CELL_DCH may be approximately 40 times that of staying in one of the lower states, e.g. CELL_FACH or URA_PCH. Hence from the RNC perspective, it is most efficient to avoid CELL_DCH except when needed due to requirements on data transmission rate. However, since there is also a processor load associated with switching, down-switching is not economical unless the UE may stay in the lower state for a certain time (depending on the specific RNC load implication).

The current or state-of-the-art solution is to base the decision of when to down-switch to a lower state on idle time which is executed when the associated down-switch timer expires, as illustrated by way of example in FIG. 3. This solution has several drawbacks which are, e.g., associated with the random nature of IAT or when the next data activity will occur. One such drawback is the probability that there is a long time until next data activity when the down-switch timer expires may be varying between applications, users etc. This implies that using down-switch timers is an inexact method to determine an optimal down-switch time. Another drawback is that adaptive channel switching techniques which use a prediction of the time to next data activity are also inexact in the sense that predictions are not always correct. That is, there is always a probability that an erroneous prediction is made.

In the above regard, of special importance is the case when the switching decision is to down-switch, either because of an expired timer or a long predicted IAT. If this decision is erroneous, the result is a considerable and unnecessary load caused by a down-switch and the following immediate up-switch. Avoiding this error is important in order to minimize the RNC load. A second type of error is when the down-switch is delayed, either by a too long down-switch timer or erroneous prediction.

Hence, due to the random nature of the IATs or time to next data activity, it is impossible to reach the theoretical optimal performance, i.e., the minimum possible RNC load given a trace of IATs. This cannot be avoided since the IAT are not known when the switching decision is taken. However, optimizing the prediction and decision taking is of considerable importance to minimize RNC load at a given traffic load.

SUMMARY

In one of its aspects the technology disclosed herein concerns a method of operating a node of a radio access network which controls transitions between radio resource control states for a wireless terminal. In an example embodiment and mode the method comprises the acts of: (1) upon completion of a data activity, making a prediction of a data transmission parameter; (2) making an assessment regarding probable accuracy of the prediction; and (3) using the assessment to make a determination whether or not to implement a radio resource control state switch (the "state switch").

The data transmission parameter may be a different parameter in respective differing example embodiments. In one example embodiment and mode the data transmission parameter comprises inter-arrival time between bursts of data activity. In another example embodiment and mode the data transmission parameter comprises burst size of a burst of data activity. In another example embodiment and mode the data transmission parameter comprises link direction, e.g., whether the next data burst is predicted to be uplink (UL) or downlink (DL).

In an example embodiment and mode, if the prediction indicates that the data transmission parameter exceeds a first predetermined value, the method further comprises either implementing or not implementing the state switch (e.g., radio resource control state switch to a lower radio resource control state), depending on the probable accuracy. If the assessment confirms the prediction, the state switch to the lower radio resource control state is implemented. However, the assessment does not confirm the prediction, the switch to the lower radio resource control state is not implemented.

In another example embodiment and mode wherein the data transmission parameter comprises inter-arrival time between bursts of data activity, the state switch to a lower radio resource control state is implemented regardless of the prediction and the assessment if the elapsed time since the last burst of data activity exceeds a limit value.

In another example embodiment and mode, if the determination is not to implement the state switch, the method further comprises making another prediction of the data transmission parameter and then performing the acts of the basic mode, e.g., acts (2)-(3), with respect to the another prediction. In an example implementation, the method further comprises waiting a predetermined time before making the another prediction. In this example implementation, the another prediction may be made using a same prediction technique as was employed to make a first or original prediction. In an alternate example implementation, the method further comprises using a first prediction technique to make the prediction of act (1); and then using a second prediction technique to make the another prediction.

In an example embodiment and mode, the act of making the assessment comprises determining that the probable accuracy exceeds an accuracy threshold. In example implementations, the method further comprises selecting the accuracy threshold in dependence upon at least one of the following: (a) a cost of making an erroneous radio resource control state switching decision; and (b) a cost of not making the radio resource control state switching decision.

In an example embodiment and mode, the prediction is expressed as a probability that the parameter has a predetermined value. In an example implementation, the data transmission parameter is inter-arrival time between bursts of data activity, and the prediction is expressed as a probability that the inter-arrival time between bursts of data activity is greater than a predetermined time value.

In an example embodiment and mode, the act of making the prediction of the data transmission parameter comprises using a tree classifier.

In another of its aspects the technology disclosed herein concerns a node of a radio access network which controls transitions between radio resource control states for a wireless terminal. The node comprises a radio resource manager and a communications interface. The resource manager is configured to: (1) make a prediction of a data transmission parameter upon completion of a data activity; (2) make an assessment regarding probable accuracy of the prediction; and (3) use the assessment to make a determination whether or not to implement a radio resource control state switch. The communications interface is configured to provide a notification to the wireless terminal whether or not to implement the state switch.

In an example embodiment the resource manager comprises a tree classifier configured to make the prediction of the data transmission parameter.

In an example embodiment, if the prediction indicates that the data transmission parameter exceeds a first predetermined value, the radio resource manager is further configured to implement the state switch as a switch to a lower radio resource control state if the assessment indicates that the probable accuracy exceeds an accuracy threshold, but not to implement the state switch if the assessment indicates that the probable accuracy does not exceed the accuracy threshold.

In another example embodiment wherein the data transmission parameter comprises inter-arrival time between bursts of data activity, the radio resource manager is configured to implement the state switch to a lower radio resource control state regardless of the prediction and the assessment if the elapsed time since the last burst of data activity exceeds a limit value.

In another example embodiment, if the determination is not to implement the state switch, the radio resource manager is configured to make another prediction of the data transmission parameter and then to perform acts (2)-(3) with respect to the another prediction. In an example implementation, the radio resource manager is configured to wait a predetermined time before making the another prediction. In an alternative implementation, the radio resource manager is configured to use a first prediction technique to make the prediction of act (1) and to use a second prediction technique to make the another prediction.

In an example embodiment, the radio resource manager is configured to make the assessment by determining that the probable accuracy exceeds an accuracy threshold. In an example embodiment and mode, the radio resource manager is configured to select the accuracy threshold in dependence upon at least one of the following: (a) a cost of making an erroneous radio resource control state switching decision; and (b) a cost of not making the radio resource control state switching decision.

In another example embodiment, the radio resource manager is configured to express the prediction as a probability that the parameter has a predetermined value.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
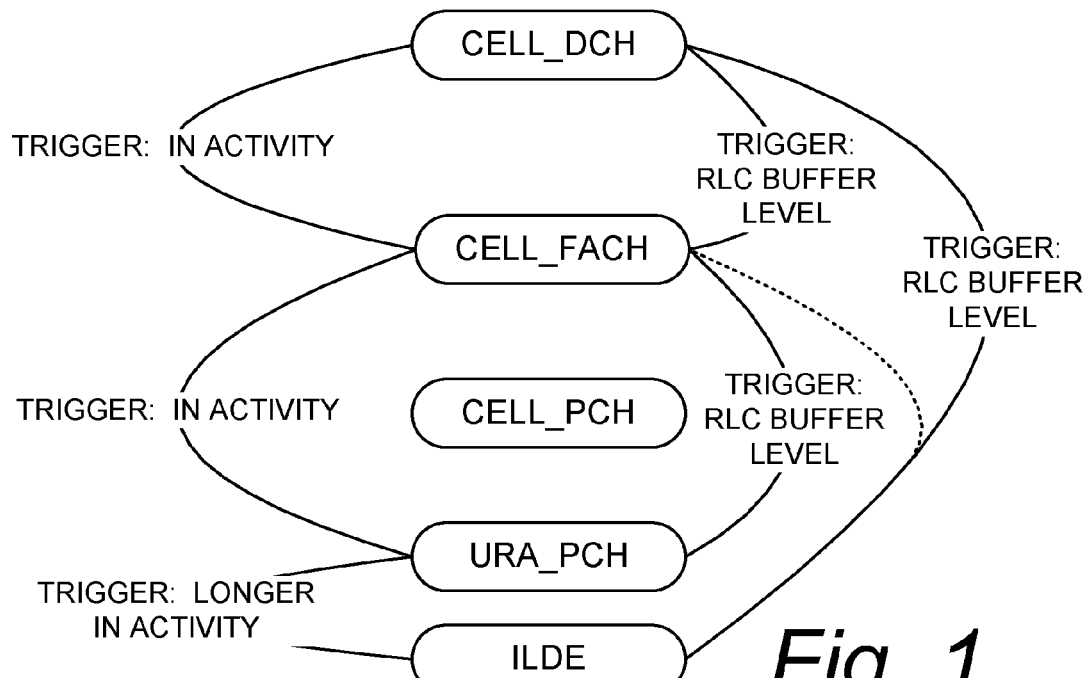
FIG. 1 is a diagrammatic view showing radio resource control states.
Figure 2:
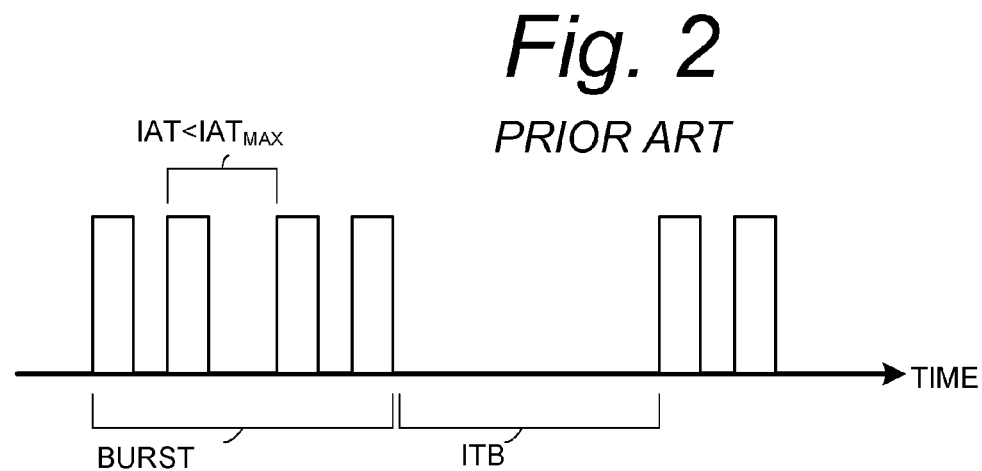
FIG. 2 is a diagrammatic view depicting, e.g., a burst, maximum inter-arrival time (IATmax) between packets of a burst, and idle time between bursts (ITB).
Figure 3:
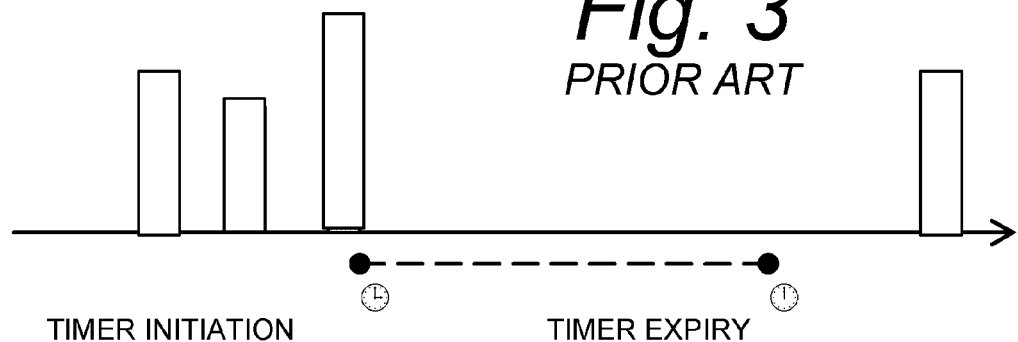
FIG. 3 is a diagrammatic view depicting conventional timer operation relative to the sending and receiving IP packets.

In the following description, for purposes of explanation and not limitation, specific details are set forth such as particular architectures, interfaces, techniques, etc. in order to provide a thorough understanding of the present disclosure. However, it will be apparent to those skilled in the art that the present disclosure may be practiced in other embodiments that depart from these specific details. That is, those skilled in the art will be able to devise various arrangements which, although not explicitly described or shown herein, embody the principles of the present disclosure and are included within its spirit and scope. In some instances, detailed descriptions of well-known devices, circuits, and methods are omitted so as not to obscure the description of the present embodiments with unnecessary detail. All statements herein reciting principles, aspects, and embodiments of the disclosure, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein may represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 4:
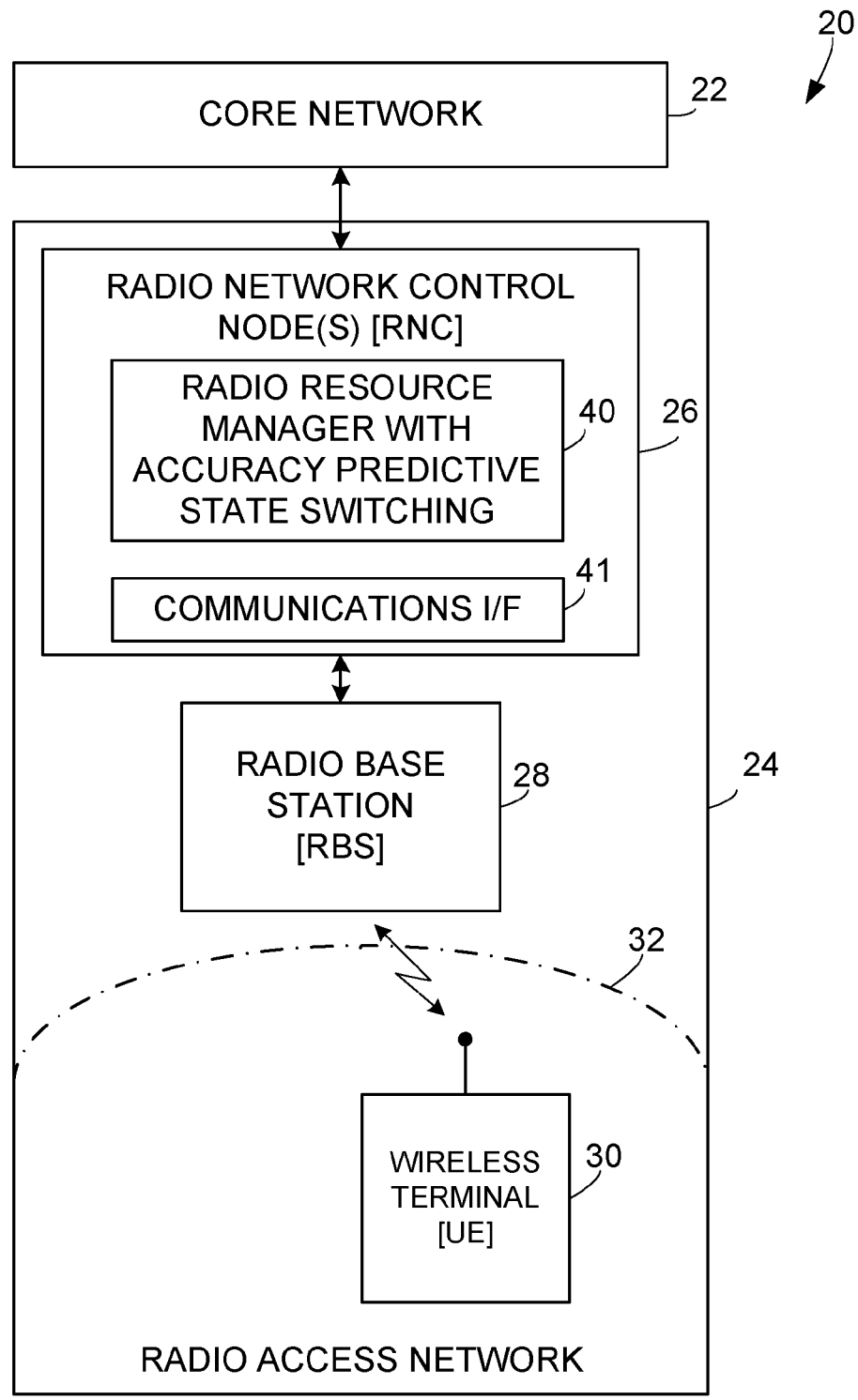
FIG. 4 is a simplified schematic view of an example communications network comprising a radio network controller node having an accuracy predictive switching radio resource manager.

FIG. 4 illustrates an example communications network 20 which comprises core network 22 and radio access network 24. As understood from the foregoing, in an example embodiment radio access network 24 comprises one or more radio network controller nodes (RNC) 26 and one or more radio base station nodes (BS) 28. A wireless terminal 30 communicates with the radio base station node 28 over a radio or air interface 32.

The wireless terminal may be called by other names and comprise different types of equipment. For example, the wireless terminal may also be called a mobile station, wireless station, or user equipment unit (UE), and may be equipment such as a mobile telephone ("cellular" telephone) and a laptop with mobile termination, and thus may be, for example, portable, pocket, hand-held, computer-included, or car-mounted mobile devices which communicate voice and/or data with radio access network.

As further shown in FIG. 4, radio network controller node 26 comprises radio resource manager 40, which is generic to essentially all embodiments described herein. The radio resource manager 40 of the technology disclosed provides dynamic UE/RRC state switching, and is also known as accuracy predictive switching radio resource manager 40. The node 26 also comprises a communications interface 41 through which the node communicates, ultimately with the wireless terminal.

In one of its aspects the technology disclosed herein increases the probability of making correct radio resource control state switch decisions. The technology disclosed herein outlines strategies which not only make a prediction whether or not to make a state switch, but also take into account the accuracy of the prediction to enhance the performance of the switching decision and hence minimize the RNC load. Since the gains with respect to RNC load are largest the longer the wireless terminal stays in a lower state, the prediction should be done as soon as possible after the data activity or data burst ends.

Figure 5:
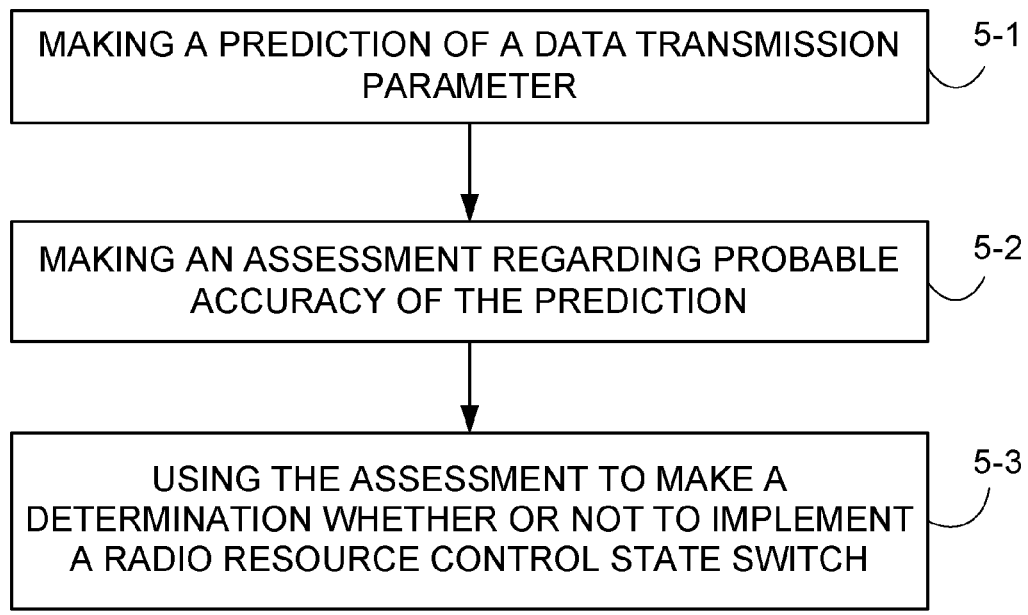
FIG. 5 is a flowchart depicting example acts or steps involved in a method of operating a node of a radio access network which controls transitions between radio resource control states for a wireless terminal.

FIG. 5 shows example acts or steps involved in a method of operating a node of a radio access network, such as radio network controller node 26, and which controls transitions between radio resource control states for a wireless terminal. As illustrated in FIG. 5, act 5-1 comprises, upon completion of a data activity, making a prediction of a data transmission parameter. Act 5-2 comprises making an assessment regarding probable accuracy of the prediction. Act 5-3 comprises using the assessment to make a determination whether or not to implement a radio resource control state switch (the "state switch"). If a state switch is implemented, such implementation is communicated by the node 26 to the wireless terminal through communications interface 41.

An aspect of the technology disclosed herein is prediction of the data transmission parameter. As explained herein, the technology disclosed herein encompasses different and several types of data transmission parameters, for which the example acts of the method of FIG. 5 and other modes hereof apply essentially uniformly. For sake of illustration one particular data transmission parameter is used herein as a representative example: inter-arrival time (IAT). Thus, it should be understood that other variables could be targeted for prediction with the same purpose, e.g. burst size, which depending on the RNC load model could be of importance for channel switching decisions.

Considering now the acts of FIG. 5 in more detail and with reference to the representative, example data transmission parameter of inter-arrival time (IAT), act 5-1 depicts that, essentially immediately after a data activity has ended, a prediction of the inter-arrival time (IAT) to the next burst is made. In an example implementation, this prediction of the data transmission parameter (of whatever type) may be of the form of the probability that the data transmission parameter exceeds a predetermined value. For example, with reference to inter-arrival time (IAT), the prediction may be of the form that the probability that the time to next burst is more than a specified value t. In an example implementation using the inter-arrival time (IAT) as the data transmission parameter, execution of act 5-1 may result in an output of either $L_{pred}$, or $S_{pred}$. $L_{pred}$ and $S_{pred}$ indicate that the next IAT is predicted to be longer or shorter, respectively, than the specified value t.

As mentioned above, act 5-2 comprises making an assessment regarding probable accuracy of the prediction. In other words, an assessment of the probability regarding the prediction of act 5-1, e.g., whether the prediction is correct or wrong. If the prediction of act 5-1 indicates a long IAT (implying that a down-switch should be made) but the assessment of Act 5-2 determines that the accuracy of the prediction is insufficient, then no down-switch decision is taken at this point.

Figure 6:
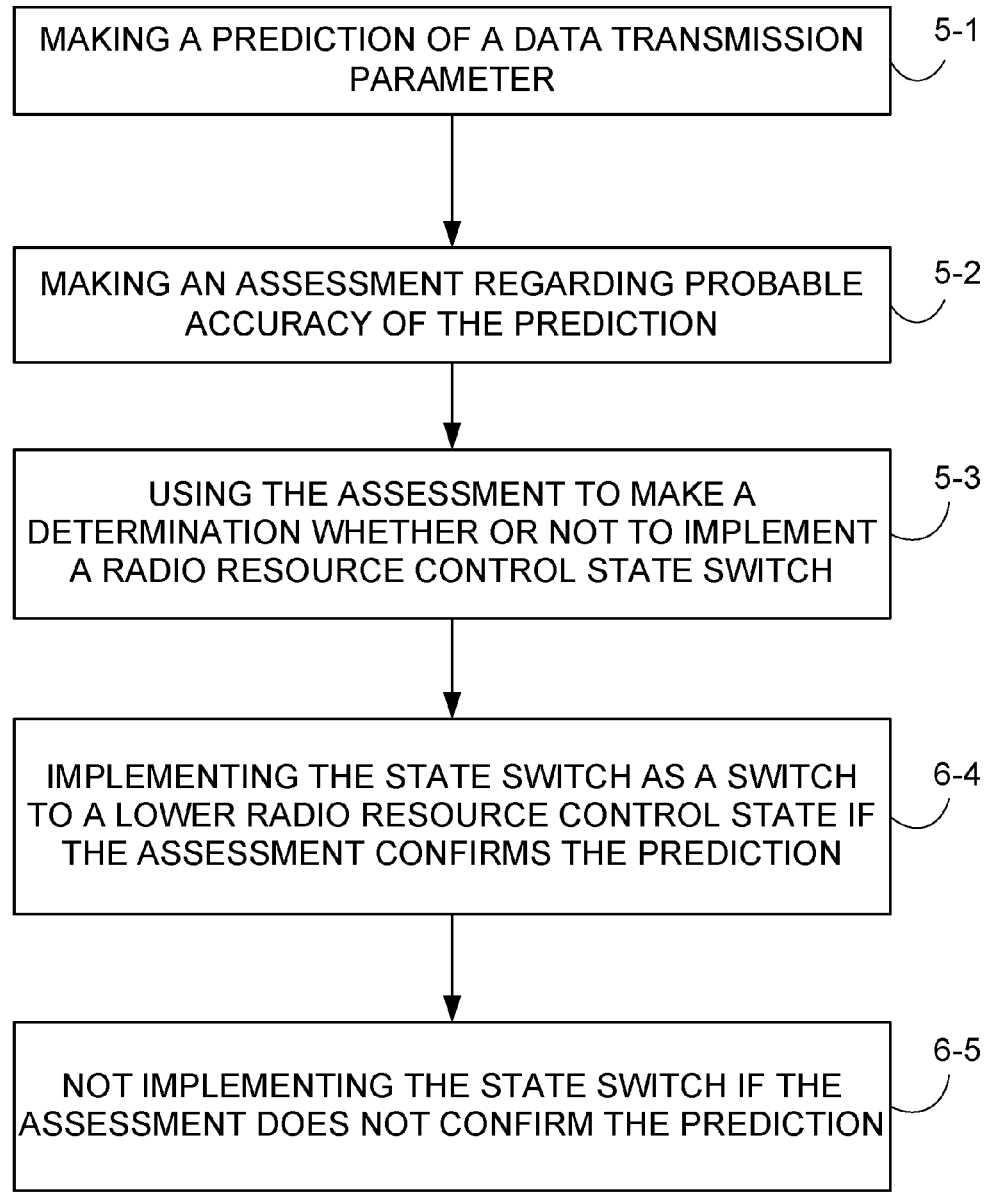
FIG. 6 is a flowchart depicting example acts or steps involved in a method of operating a node of a radio access network.

The effect of the prediction accuracy determination of Act 5-3 is further illustrated, in an example embodiment and mode, by FIG. 6. FIG. 6 specifically shows that, as a result of execution of the prediction accuracy determination of act 5-3, as act 6-4 the radio resource manager 40 implements the radio resource control state switch if the accuracy assessment confirms the prediction. On the other hand, as act 6-5 the radio resource manager 40 does not implement the radio resource control state switch if the accuracy assessment does not confirm the prediction.

Figure 7:
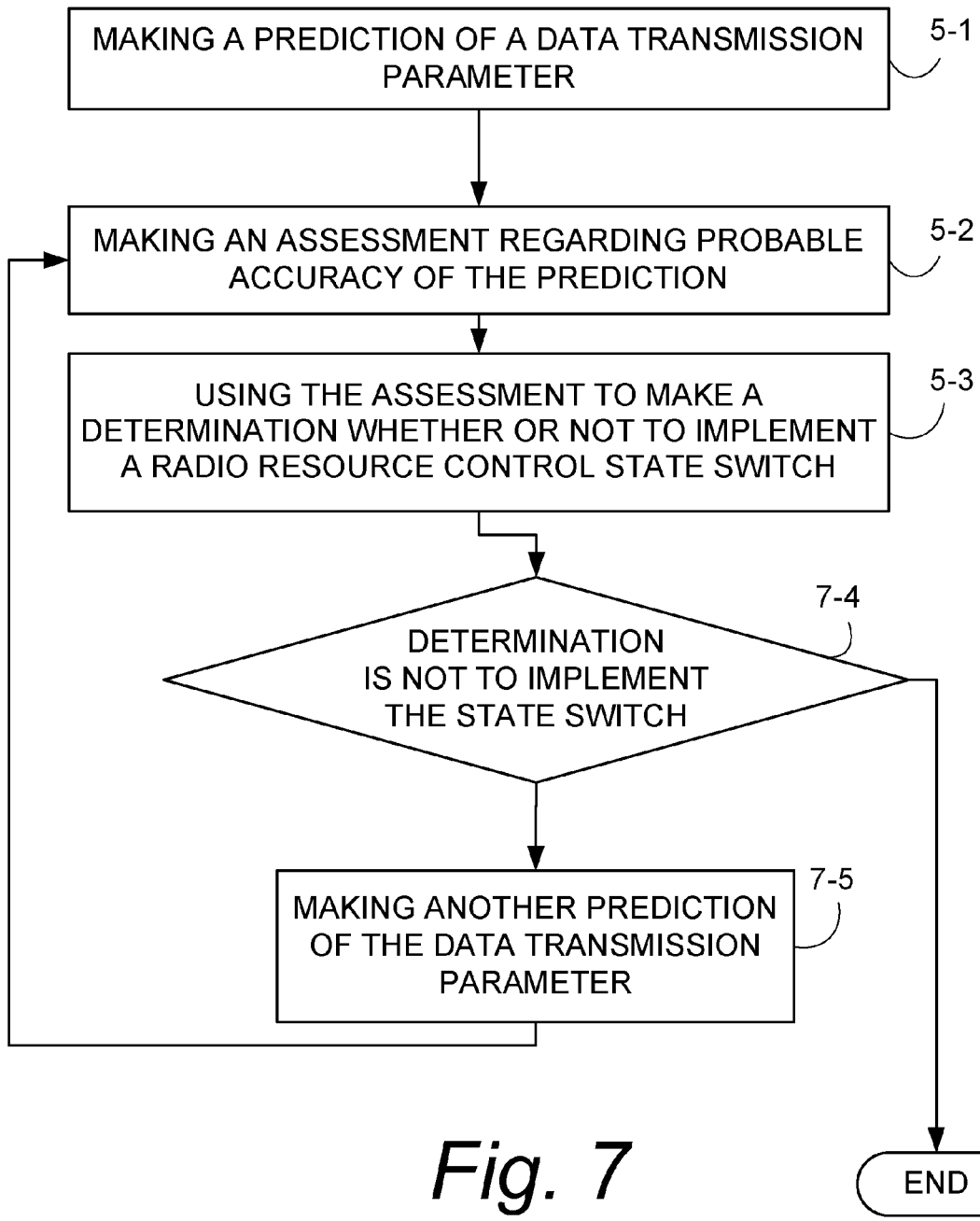
FIG. 7 is a flowchart depicting example acts or steps involved in a method of operating a node for making a radio resource control state switch including a generic approach to refining a prediction of a data transmission parameter

FIG. 7 illustrates another example embodiment and mode wherein, if the determination is not to implement the state switch, the method further comprises making another prediction of the data transmission parameter and then performing the acts of the basic mode, e.g., acts (2)-(3), with respect to the another prediction. In addition to other acts such as acts 5-1 through 5-3 of FIG. 5, FIG. 7 includes an act 7-4 of checking whether the determination of Act 5-3 is to not implement the state switch. If the check of act 7-4 indicates that the state switch was not implemented, as act 7-5 the radio resource manager 40 makes another prediction of the data transmission parameter. Then, the radio resource manager 40 repeats at least acts 5-2 through 5-3 using the prediction of act 7-5, e.g., the "another" or "new" prediction, as the prediction for acts 5-2 through 5-3. In so doing, as Act 5-2 the radio resource manager 40 makes an assessment of the probable accuracy of the new prediction developed at act 7-5, and then as Act 5-3 uses the assessment to make the determination whether or not to implement the radio resource control state switch. After the assessment of Act 5-3 the radio resource manager 40 then again executes act 7-4 to ascertain whether the state switch was implement and, if not, makes yet another prediction when again executing act 7-5. Thus, the loop of acts 5-2, 5-3, 7-4, and 7-5 may be re-executed repeatedly as needed or deemed appropriate for developing an acceptable and/or usable prediction.

Figure 7A:
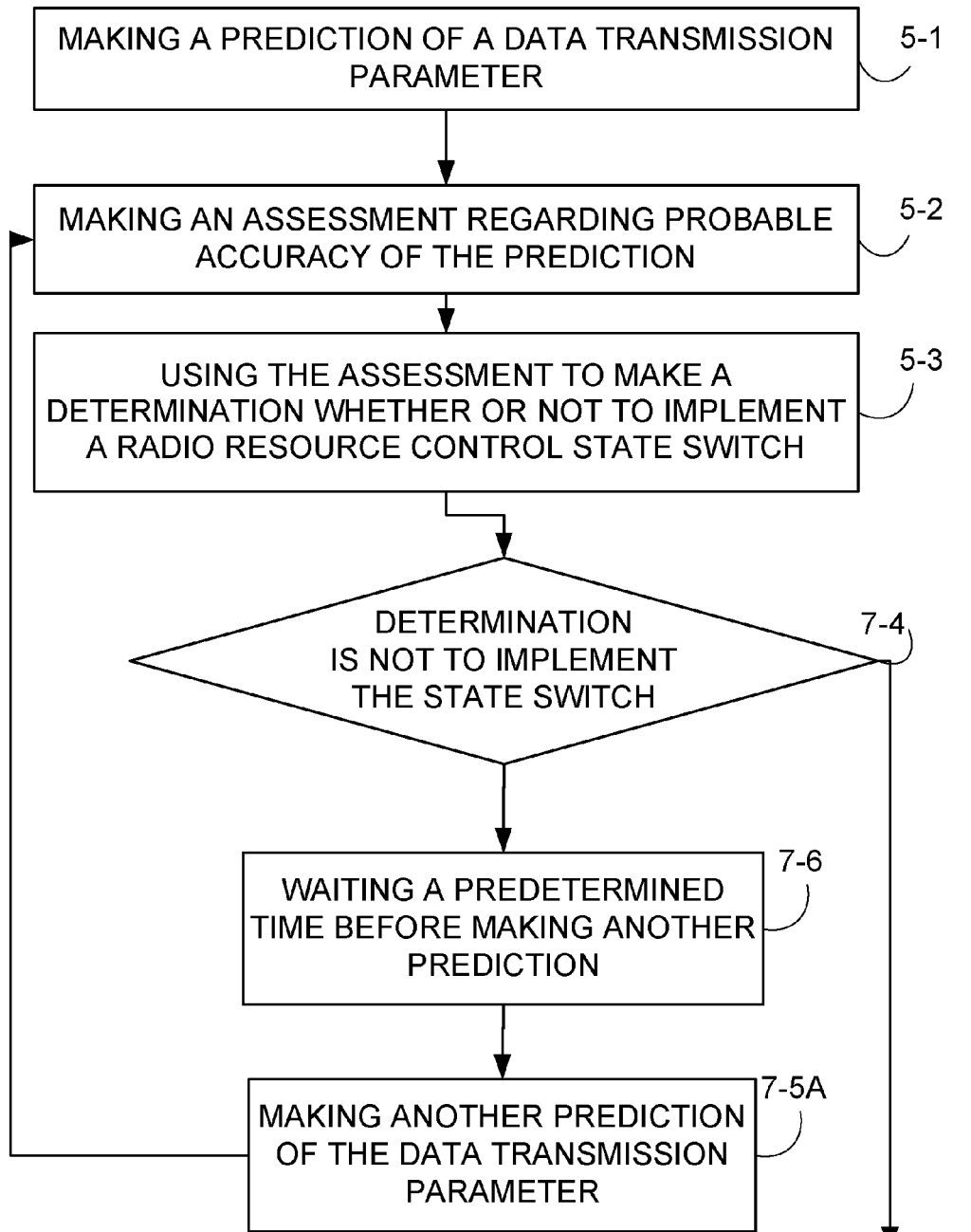
FIG. 7A and FIG. 7B are flowcharts depicting example acts or steps involved in special cases of the method of FIG. 7.
Figure 7B:
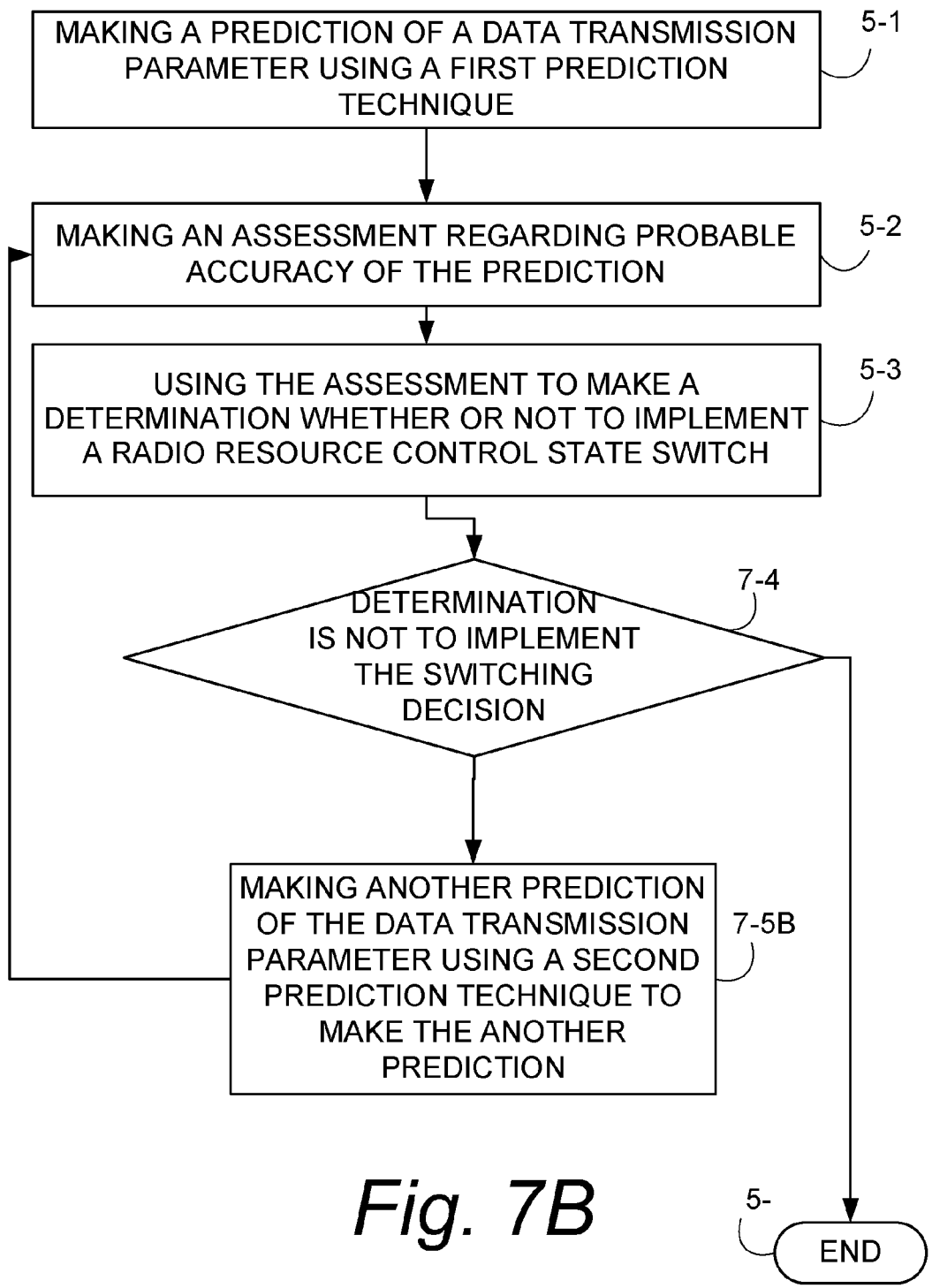

The embodiment and mode of FIG. 7 represents a generic approach to refining the prediction of the data transmission parameter in order to make a radio resource control state switch. FIG. 7A and FIG. 7B illustrate two embodiments and modes which may be special cases of the generic approach of FIG. 7.

In the embodiment and mode of FIG. 7A, if the check of act 7-4 indicates that the state switch was not implemented, as act 7-6 the radio resource manager 40 waits a predetermined time before making another prediction of the data transmission parameter. Then, after the predetermined wait time of act 7-6 has elapsed, as act 7-5A the radio resource manager 40 makes another prediction of the data transmission parameter. Typically, but not necessarily, the another prediction of act 7-5A may be made using a similar technique as was initially employed for act 5-1. Thereafter acts 5-2 through 5-3 are executed in loop like fashion as understood from the foregoing discussion of FIG. 7. Thus, as illustrated by FIG. 7A, in at least some embodiments and modes if no down-switch decision is taken, a new prediction is made after a given time, sometimes referred to as "delta" including an assessment of the accuracy of the prediction, and the process is repeated. In this fashion, the process is repeated until a sufficient accuracy of the prediction is obtained, or (as explained and understood, e.g., with reference to FIG. 8) until a sufficiently long time has passed since the last data activity.

A first prediction technique is used to make the prediction of act 5-1. Examples of prediction techniques are described elsewhere herein and additionally are known to the person skilled in the art. In the embodiment and mode of FIG. 7B, if the check of act 7-4 indicates that the state switch was not implemented, as act 7-5B the radio resource manager 40 uses a second prediction technique to make the another prediction. The second prediction technique is different from, and usually more sophisticated or more exacting than the first prediction technique. Thereafter act 5-2 through Act 5-3 are executed in loop like fashion as understood from the foregoing discussion of FIG. 7.

Figure 8:
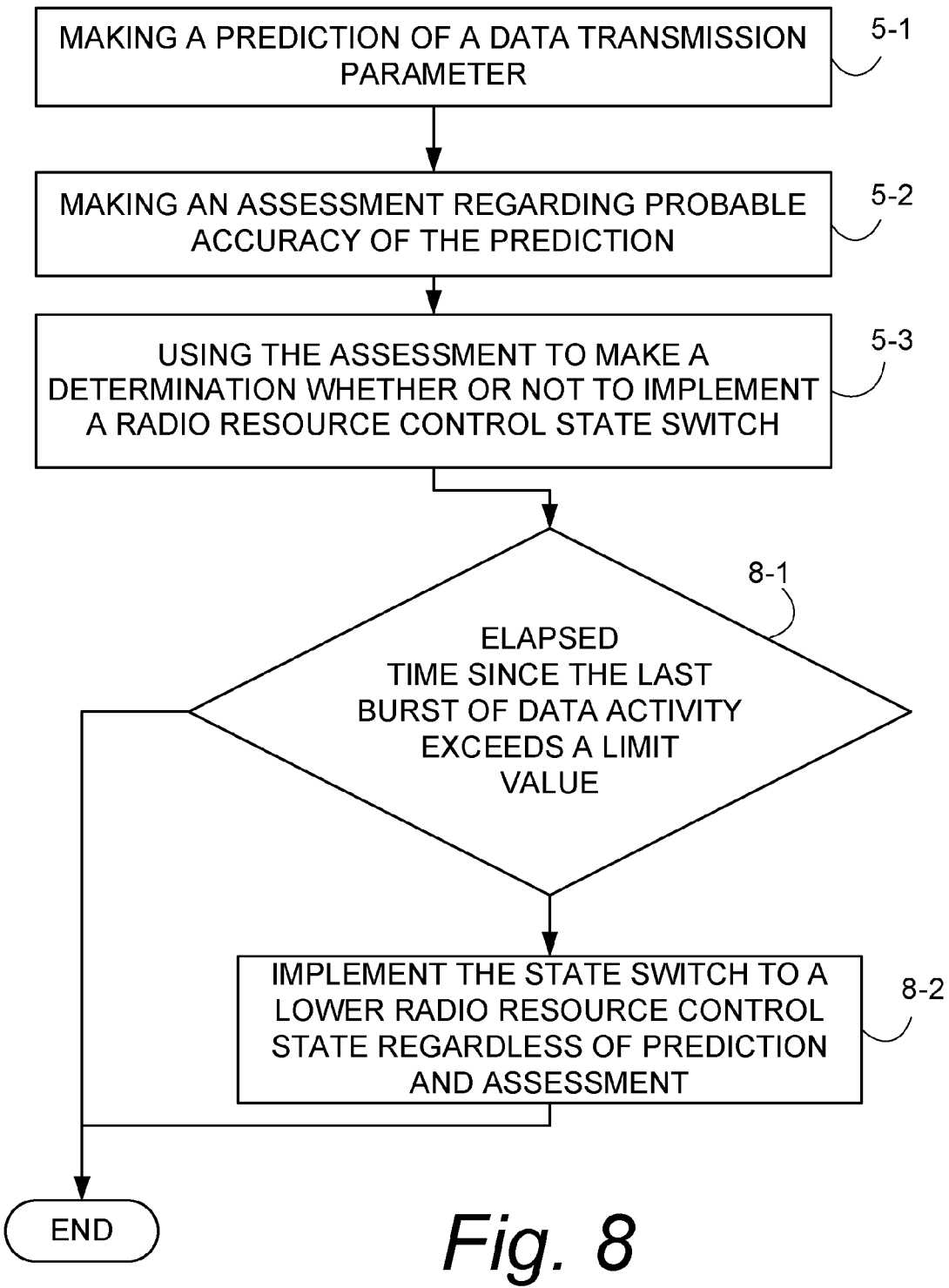
FIG. 8 is a flowchart depicting example acts or steps involved in another embodiment and mode of a method of operating a node of a radio access network.

FIG. 8 illustrates another example embodiment and mode which also includes acts such as act 5-1 and Act 5-3 as previously described. In addition, the embodiment and mode of FIG. 8 comprises act 8-1 and act 8-2. Act 8-1 comprises the radio resource manager 40 determining or otherwise ascertaining if the elapsed time since the last burst of data activity exceeds a limit value. If the determination of act 8-1 is positive, act 8-2 is performed. Act 8-2 comprises implementing the state switch to a lower radio resource control state regardless of the prediction of act 5-1 and the assessment of act 5-2. Thus, in the embodiment of FIG. 8, the radio resource manager 40 implements the state switch to a lower radio resource control state is implemented regardless of the prediction and the assessment if the elapsed time since the last burst of data activity exceeds a limit value.

Figure 9:
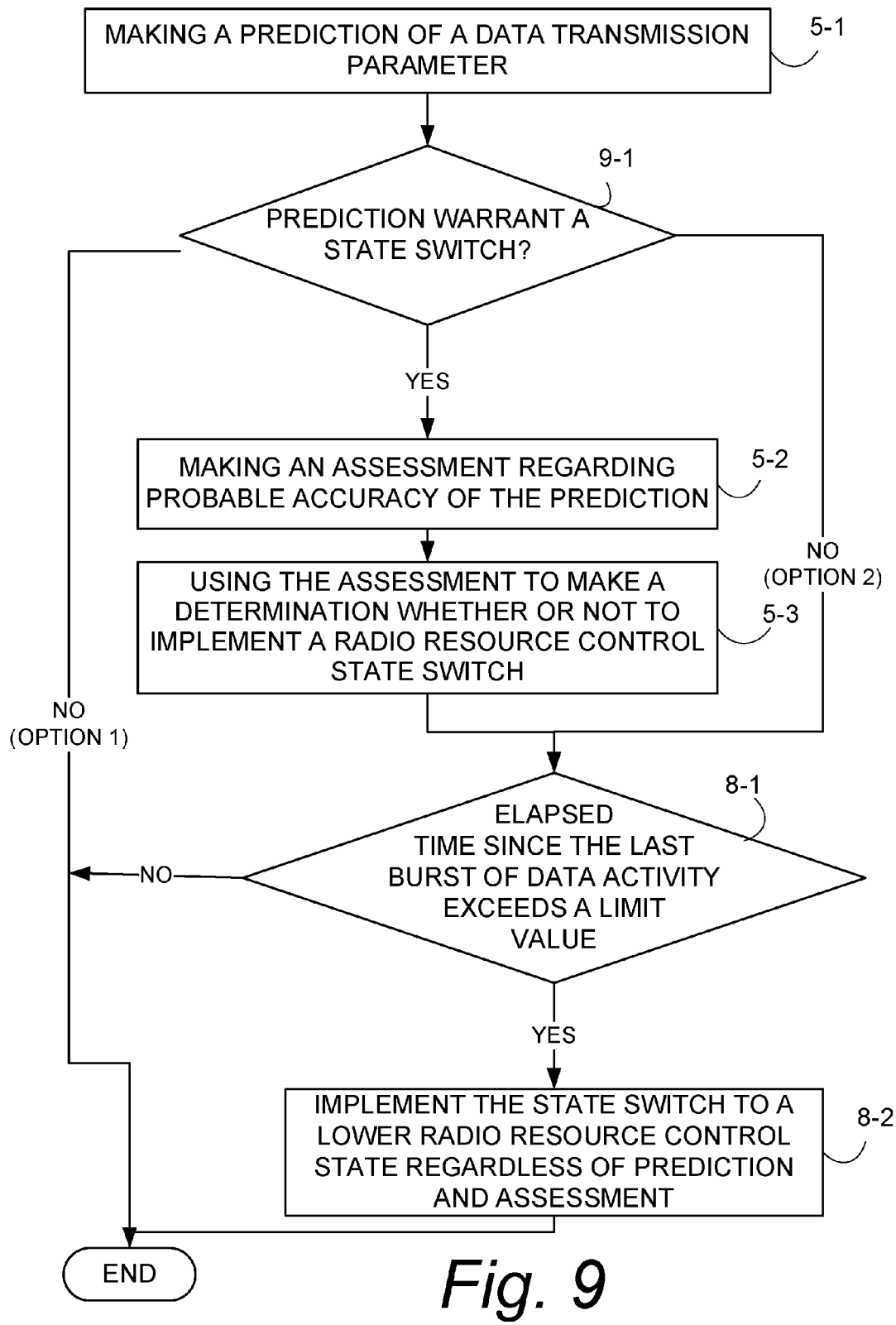
FIG. 9 is a flowchart depicting example acts or steps involved in yet another embodiment and mode of a method of operating a node of a radio access network.

FIG. 9 illustrates an embodiment and mode in which addresses what may happen if the prediction of the data transmission parameter as performed at act 5-1 indicates to the radio resource manager 40 that a state switch should not be made. In this regard, act 9-1 shows the radio resource manager 40 checking whether the prediction as made by act 5-1 warrants a state switch. It may be, for example, that even before the assessment of at 5-2 the prediction is of such small magnitude or value as to seemingly already rule out the state switch. In such case, the radio resource manager 40 has several options as reflected by FIG. 9. One such option (option 1) is to avoid act 5-2 and Act 5-3 and thereby essentially exit the routine of FIG. 9 with respect to the completed data activity, and then re-enter the routine upon completion of the next data activity. Another option (option 2) is for the radio resource manager 40 to check whether the elapsed time since the completed data activity exceeds a limit value, in the manner of act 8-1 of FIG. 8. If the determination of act 8-1 is positive, act 8-2 is performed. Act 8-2 comprises implementing the state switch to a lower radio resource control state regardless of the prediction of act 5-1. It should be understood that the check of act 9-1 (regarding whether the prediction warrants a state switch or not) and the resultant two options are also usable or combineable with other embodiments, whether or not specifically shown or stated herein.

As described above, as act 5-1 the radio resource manager 40 makes a prediction of a data transmission parameter upon completion of a data activity.

To make the prediction of act 5-1 the radio resource manager 40 may use one or more of a variety of prediction techniques or algorithms. In one example embodiment the radio resource manager 40 may employ a Cumulative Distribution Function (CDF) as a predictor. For example, a Cumulative Distribution Function (CDF) may be used as a predictor in an implementation in which inter-arrival time (IAT) is the data transmission parameter.

In general terms, a Cumulative Distribution Function (CDF) of a quantity such as burst inter-arrival time (e.g., CDF(IAT)) may give an assessment of the prediction accuracy, since it gives the probability that IAT$<=$x. From this, the probability that IAT is greater than x, e.g., P(IAT$>$x), may be derived as P(IAT$>$x)=1−P(IAT$<=$x). So if a prediction may be made that the next IAT is $>$x, the probability of an erroneous prediction is the CDF at x (e.g., PIAT$<=$x). From the CDF, it is also possible to derive the corresponding probabilities of erroneous predictions if the prediction is made at a later time t_delta (e.g., predicting after waiting t_delta).

While use of a Cumulative Distribution Function (CDF) may be computationally efficient in some example embodiments, in other embodiments more accurate predictions may be obtained with techniques such as discriminant analysis or decision tree algorithms. The input information applied to the the predictors may include data such as inter-arrival time (IAT), data burst sizes, and UL/DL direction of data, for example. Other input information which may be applied to the predictors may comprise device type, application, etc.

In general, the precision of the prediction performed as act 5-1 may depend on several factors, e.g. prediction method, traffic type, specific user, number of samples used to obtain the predictor, etc.

It was mentioned above that, in an example embodiment and implementation in which the data transmission parameter is inter-arrival time (IAT), the outcome of the prediction of act 5-1 may be either $L_{pred}$ or $S_{pred}$, which respectively indicate that the next IAT is predicted to be longer or shorter than a specified value or predetermined value t. As understood from the foregoing, if the outcome of the prediction of act 5-1 is $S_{pred}$, there may be no down-switch (see, for example, act 9-1 of FIG. 9). But if the outcome of the prediction of act 5-1 is $L_{pred}$ (e.g., the next IAT is predicted to be longer than t), the assessment of Act 5-2 is performed.

The assessment of Act 5-2 may be performed in various ways. One example way of performing the assessment of Act 5-2 is to make an estimation of the probability that the next IAT is really long, given that it is predicted to be long, i.e. $P(IAT > t | L_{pred})$. If this value is greater than a probability threshold $A_{lim}$, the prediction may be trusted and a down-switch decision may be made. Thus, in an example embodiment and implementation the assessment Act 5-2 may comprise determining that the probable accuracy of the prediction exceeds an accuracy threshold, e.g., $A_{lim}$.

The value of the accuracy limit, Alim, may be chosen in relation to the cost of doing an erroneous decision and also weighted with respect to the cost of not taking a decision, e.g., waiting until next decision occasion. The cost may be, for example, load of nodes for different decisions, and also the current load or cost situation of the system or particular system nodes. In terms of cost of decision, for sake of generality for a first case suppose that the cost for downswitching when the prediction is correct is "1.0", while the cost of downswitching when the prediction is erroneous is "10.0". In this first case one needs a high accuracy of the prediction to do a downsearch, since the cost is very high if the prediction is incorrect. On the other hand, in another (second) case suppose that the cost of an erroneous downswitch is only "1.5". In this second case one does not need such a high accuracy of the prediction to do a downswitch, since not much is lost in terms of cost if the prediction is wrong. It may be in some cases be that $P(IAT > t | L_{pred})$ is rather low, e.g., less than $A_{lim}$, and therefore the assessment of Act 5-2 indicates that the prediction of act 5-1 is not to be trusted. In this case a new, more accurate prediction may be needed.

As described above, FIG. 7 shows generic methods and techniques for obtaining another (e.g., a "new") prediction in case the assessment of Act 5-2 does not lead to a state switch. As understood from the subcase of FIG. 7A above and act 7-6, the new prediction may be obtained by waiting a predetermined time period (e.g., t before obtaining a new prediction (act 7-5 A, which may be performed using sing the same or another prediction technique. As understood from the subcase of FIG. 7B above and act 7-5 B, the new prediction may also be obtained using a more sophisticated prediction technique (typically more computationally demanding). In either the case of FIG. 7A or FIG. 7B, if the outcome of this second prediction is $L_{pred}$, the accuracy of this second prediction is also assessed at act 5-2. This process is repeated until the accuracy of the prediction is higher than $A_{lim}$ or until a sufficient time has passed since the last data activity, i.e. time since first prediction is higher than $t_{lim\_delta}$.

The predictions and the assessment of the prediction accuracy may be made in different ways depending in the actual prediction technique or algorithm used. In an example embodiment and implementation, a tree classifier is used which may operate based on a trace of the users traffic. An example of a tree classifier is a C4.5 classifier. A C4.5 classifier builds decision trees from a set of training data using a concept of information entropy. The training data input into the C4.5 classifier is a set S=s1, s2, . . . of already classified samples. Each sample si=x1, x2, . . . is a vector where x1, x2, . . . represent attributes or features of the sample. The training data is augmented with a vector C=c1, c2, . . . where c1, c2, . . . represent the class to which each sample belongs. At each node of the tree, the C4.5 classifier chooses one attribute of the data that most effectively splits its set of samples into subsets enriched in one class or the other. Its criterion is the normalized information gain (difference in entropy) that results from choosing an attribute for splitting the data. The attribute with the highest normalized information gain is chosen to make the decision. The C4.5 algorithm then recurses on the smaller sublists.

As mentioned above, in an example implementation the C.45 tree classifier may operate on a trace of user traffic. Several input variables derived from the trace may be used such as burst size, uplink (UL) or downlink (DL) direction, previous IAT, average burst size in the trace, etc. The classifier is trained on historical traces, either a sample from the network or more fine grained based on application, device types, or users, etc. The training of the classifier may result in a classifier tree which is used to predict new IATs. When a new IAT is predicted, this is done by using the input variables corresponding to the IAT and this will place the prediction in an endpoint of the tree (a leaf). The distribution of IATs in the training set that also where placed in this leaf is an assessment of the prediction accuracy of the IAT that is predicted.

As an example of operation of the a C4.5 classifer according to the foregoing, in a certain leaf the distribution between long and short in the training data may be, e.g., 0.75/0.25 indicating an accuracy of 75%. In another leaf the distribution may be e.g. 0.6/0.4, indicating an accuracy of 60%. If the fraction of long IATs in the training data is lower than 50%, the IAT is predicted to be short. Training on different data will result in different trees so that the tree resulting on training on data with different a $t_{delta}$ will give different trees with possibly different classifications and different accuracies.

For users for whom the prediction accuracies are good the switching decision may be taken almost immediately after the end of a data activity. For other users a new prediction is made after a time delta ($t_{delta}$) followed by a new decision, as understood with respect to FIG. 7 and its cases of FIG. 7A and FIG. 7B. This is repeated as in the example above until either a down-switch decision is taken or the time since the first prediction is higher than $t_{lim\_delta}$ ($t_{delta} \ll t_{lim\_delta}$).

Figure 10:
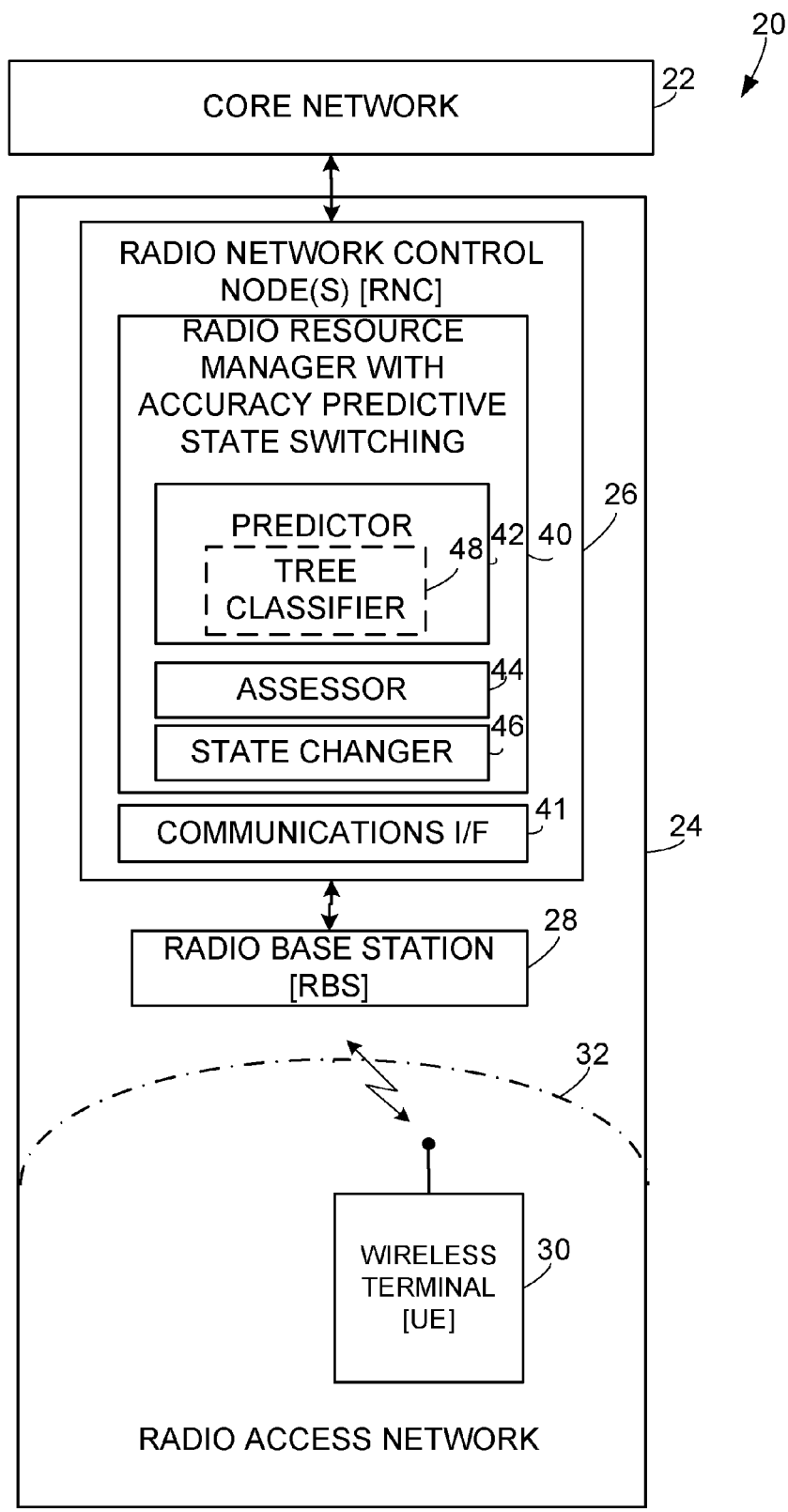
FIG. 10 is a schematic view showing more details of a non-limiting, example implementation of the radio network controller node of FIG. 4.

FIG. 10 resembles FIG. 4 but shows more example details of an example embodiment and implementation of radio resource manager 40. In particular, FIG. 10 shows radio resource manager 40 as comprising predictor 42 (which implements act 5- 1); prediction assessor 44 (which implements act 5-2); and state changer 46 (which implements act 5-3). Since a tree classifer is one example a prediction technique, FIG. 10 further depicts by broken lines that tree classifer 48 may comprise the predictor 42.

Figure 11:
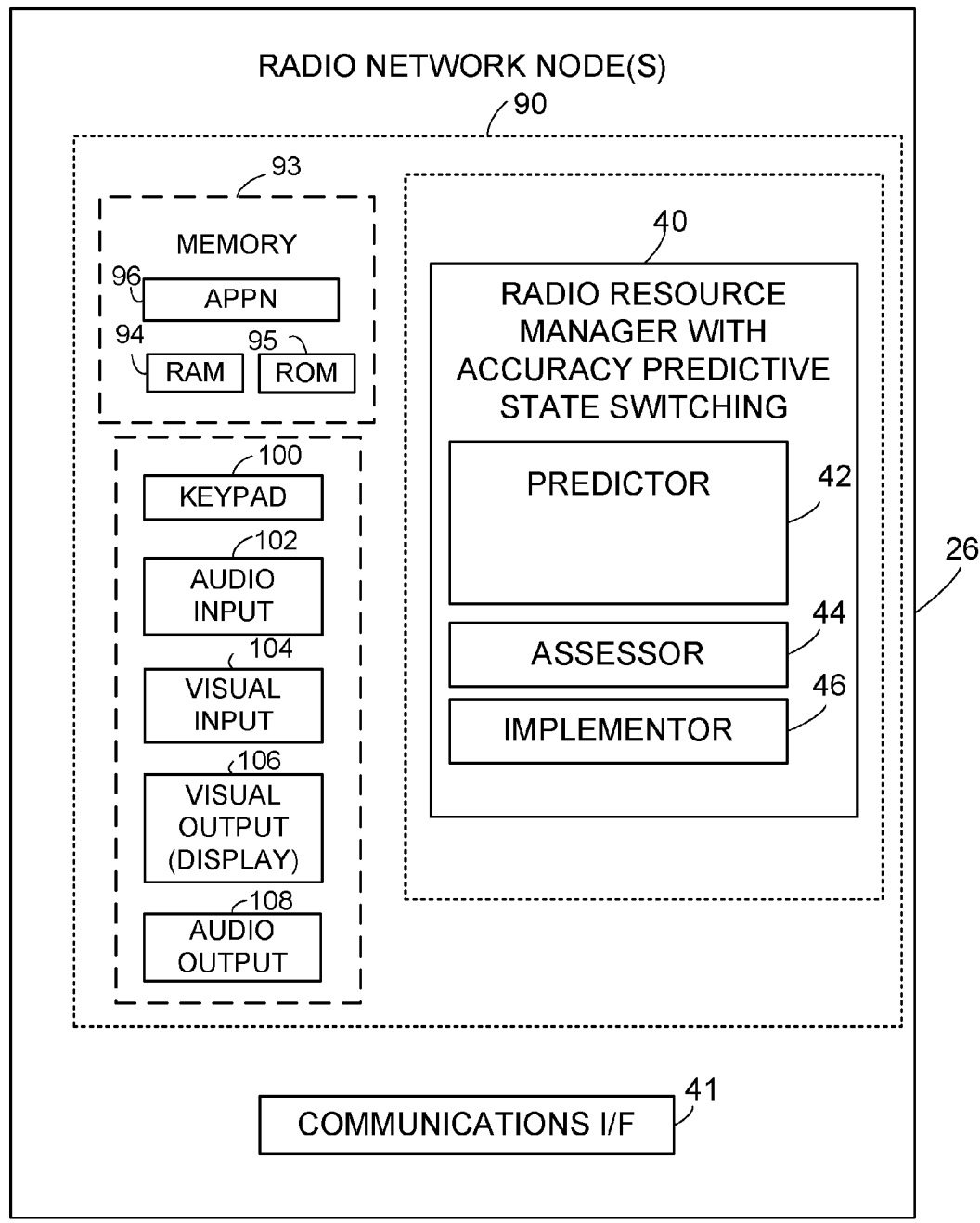
FIG. 11 is a schematic view showing that various elements of the radio network node of FIG. 10 or other embodiments may be provided on a machine platform.

FIG. 11 illustrates more structural detail for a radio network node 26 which may be applicable to implementations of any of the foregoing embodiments or other embodiments encompassed hereby. For example FIG. 11 illustrates that various elements of radio network node 26 may be provided on a machine platform 90. The terminology "platform" is a way of describing how the functional units of radio network node 26 may be implemented or realized by machine. The machine platform 90 may take any of several forms, such as (for example) a computer implementation platform or a hardware circuit platform. FIG. 11 particularly shows machine platform 90 as being a computer platform wherein logic and functionalities of radio network node 26 including but not limited to radio resource manager 40 are implemented by one or more computer processors or controllers as those terms are herein expansively defined. The radio resource manager 40 of FIG. 11 may represent radio resource managers any of the foregoing embodiments.

In such a computer implementation the radio network node 26 may comprise, in addition to a processor(s), memory section 93 (which in turn may comprise random access memory 94; read only memory 95; application memory 96 (a non-transitory computer readable medium which stores, e.g., coded non instructions which may be executed by the processor to perform acts described herein); and any other memory such as cache memory, for example). The platform 90 may also comprise certain input/output units or functionalities, the representative input/output units for being illustrated in FIG. 11 being keypad 100; audio input device (e.g. microphone) 102; visual input device (e.g., camera) 104; visual output device (e.g., display 106); and audio output device (e.g., speaker) 108.

The technology disclosed herein also encompasses a computer program product which is used to configure the radio resource manager 40. The computer program product comprises coded instructions stored on non-transient medium, such as a disk, CD, or other memory device. When executed on a processor such as that of the aforementioned platform comprising the radio resource manager 40, the computer program product executes acts such as those described in conjunction with the preceding embodiments, including but not limited to the act 5-1, 5-2, and 5-3, for example. In addition, the instructions of the computer program product may be configured or arranged to accomplish any of the other acts, modes, or implementations described herein.

In the example of FIG. 11 the platform 90 has been illustrated as computer-implemented or computer-based platforms. Another example platform suitable for radio network node 26 is that of a hardware circuit, e.g., an application specific integrated circuit (ASIC) wherein circuit elements are structured and operated to perform the various acts described herein.

It will be appreciated that the example embodiments of radio network nodes herein described or encompassed, including but not limited to those of FIG. 4, FIG. 10, and FIG. 11 may and typically do comprise other units or functionalities known to the person skilled in the art. For example, radio network controller nodes typically include handover functionality and diversity functionality, e.g., combining and splitting capabilities.

The technology disclosed in any of the embodiments described herein or encompassed hereby is general and applicable to any mobile telecommunications standard employing transitions between states like UE/RRC states.

There are several reasons for success of the technology disclosed herein, one reason being that there are large differences between hit rates of the predictions for different users or cases. Hence, users or cases which may be predicted accurately may be down-switched quickly, while at the same time, the risk of erroneously down-switching other users is minimized.

Figure 12:
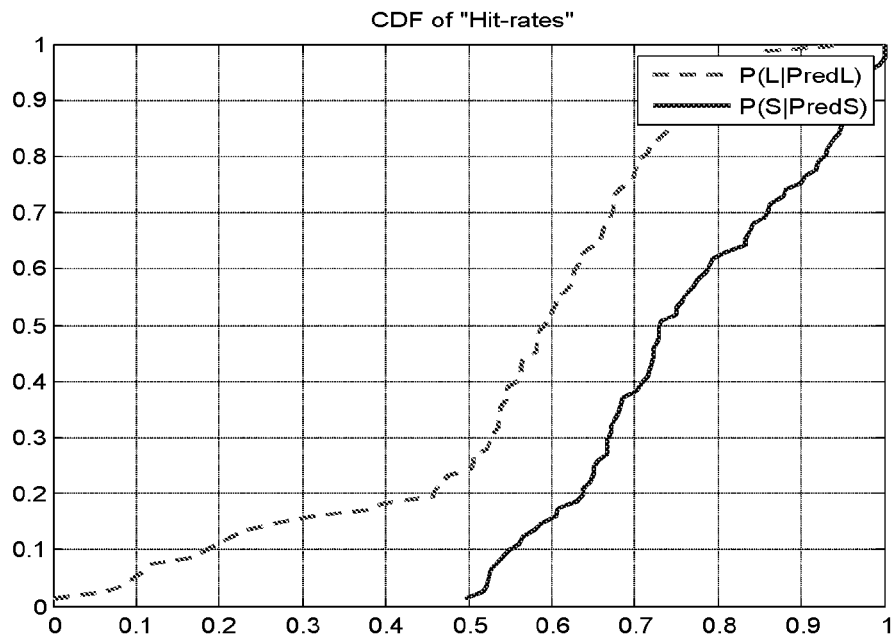
FIG. 12 and FIG. 13 and are graphs showing prediction accuracy when a prediction is made at two respective differing times.
Figure 13:
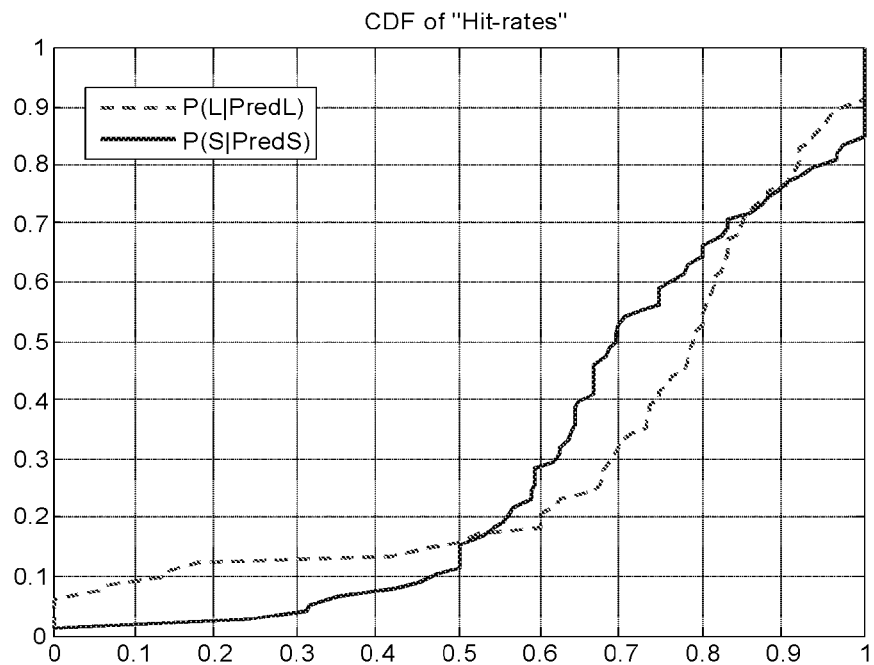

The increase accuracy of this algorithm is illustrated with the help of FIG. 12 and FIG. 13. FIG. 12 illustrates the cumulative distribution function of $P(IAT>L_{lim}|L_{pred})$ and $P(IAT<L_{lim}|S_{pred})$ for various users. That is, FIG. 12 illustrates a hit rate when the prediction is made immediately at the end of a data burst transmission, $L_{lim}=2$. The broken line in FIG. 12 shows the cumulative distribution function (CDF) of the prediction accuracy in a situation in which the prediction has given that the IAT is longer than 2 seconds. Correspondingly the solid line in FIG. 12 shows the CDF of the prediction accuracy in the case that the prediction has given that the IAT is shorter than 2 seconds.

FIG. 13 illustrates the cumulative distribution function of $P(IAT>L_{lim}|L_{pred})$ and $P(IAT<L_{lim}|S_{pred})$ for various users when $t_{delta}=2$. That is, FIG. 13 depicts the $t_{delta}$ accuracy of the predictions for different users at $t_{delta}=2$. Hence, the prediction is made after 2 seconds after the end of a data burst whether next burst will be after or before another 2 seconds.

Compared to the result of FIG. 12, the prediction accuracy is 80% and 70% at the 50-percentile compared to 60% and 73% in FIG. 13.

Logic for implementing an example embodiment and mode of the technology disclosed herein is provided below. In the logic notation the variable L which is the time without data activity for which it is optimal from an RNC load perspective to down-switch to a lower state.

1 Immediately after data activity (burst) set delta=0
   1.1 Predict if next IAT is larger than L
   1.2 If prediction in 1.1 is yes
      1.2.1 If the accuracy or hit rate for this prediction is $>A_{lim}$ then down-switch decision is taken
      1.2.1 Otherwise no down-switch decision and wait $t_{delta}$ and go to 1.1. N*ote*: if time since last data activity is $>t_{lim\_delta}$ then down-switch
   1.3 If prediction in 1.1 is no
      1.3.1 no down-switch decision and wait $t_{delta}$ and go to 1.1. Note: if time since last data activity is $>t_{lim\_delta}$ then down-switch The technology disclosed herein increases the precision in channel switching decisions in adaptive channel switching by taking into account the accuracy of the predictions of the length until the next data activity will take place. Taking the accuracy of the prediction into account may increase the gains from adaptive channel switching in terms of RNC load which may otherwise suffer from an increased rate of non optimal channel down-switches.

The technology disclosed herein may make it possible to more fully take advantage of adaptive channel switching and also to combine this approach with present timer based solutions.

Although the description above contains many specificities, these should not be construed as limiting the scope of the technology disclosed herein but as merely providing illustrations of some of the presently preferred embodiments of the disclosed technology. Therefore, it will be appreciated that the scope of the technology disclosed herein fully encompasses other embodiments which may become obvious to those skilled in the art, and that the scope of the technology disclosed herein is accordingly to be unduly limited. Reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly encompassed hereby. Moreover, it is not necessary for a device or method to address each and every problem sought to be solved by the technology disclosed herein for it to be encompassed hereby.

What is claimed is:

1. A method of operating a node of a radio access network which controls transitions between radio resource control states for a wireless terminal, the method comprising the acts of:
(1) upon a completion of a data activity, making a prediction of a data transmission parameter, the data activity being a transfer of data between the wireless terminal and the node;
(2) making an assessment regarding probable accuracy of the prediction; and
(3) using the assessment to make a determination whether or not to implement a radio resource control state switch,
wherein making the assessment comprises determining that the probable accuracy of the prediction exceeds an accuracy threshold, and
wherein the accuracy threshold is selected based on one or both of a weighted cost of erroneously making a decision to switch the radio resource control state, and a weighted cost of erroneously making a decision not to switch the radio resource control state.

2. The method of claim 1, wherein the data transmission parameter comprises at least one of:
an inter-arrival time between bursts of data activity; and,
a burst size of a burst of data activity.

3. The method of claim 1, wherein the data transmission parameter comprises an inter-arrival time between bursts of data activity, the method further comprising:
implementing the state switch to a lower radio resource control state regardless of the prediction and the assessment when an elapsed time since a last burst of data activity exceeds a limit value.

4. The method of claim 1, wherein when the determination is not to implement the state switch, the method further comprising making another prediction of the data transmission parameter and then performing acts (2)-(3) with respect to the another prediction.

5. The method of claim 4, further comprising waiting a predetermined time before making the another prediction but making the another prediction before a next data activity occurs.

6. The method of claim 4, further comprising:
using a first prediction technique to make the prediction of act (1);
using a second prediction technique to make the another prediction.

7. The method of claim 1, further comprising making the assessment regarding the probable accuracy of the prediction after making the prediction of the data transmission parameter so that the assessment confirms the prediction.

8. The method of claim 1,
wherein the prediction of the data transmission parameter is a prediction of the inter-arrival time to the next burst, and
wherein when the determination is not to implement the state switch, the method further comprises making another prediction of the inter-arrival time to the next burst and then performing acts (2)-(3) with respect to the another prediction.

9. A node of a radio access network which controls transitions between radio resource control states for a wireless terminal, the node comprising:
a radio resource manager configured to:
(1) make a prediction of a data transmission parameter upon a completion of a data activity, the data activity being a transfer of data between the wireless terminal and the node;
(2) make an assessment regarding probable accuracy of the prediction determining that the probable accuracy exceeds an accuracy threshold;
(3) use the assessment to make a determination whether or not to implement a radio resource control state switch; and
a communications interface through which the node notifies the wireless terminal whether or not to implement the state switch,
wherein the accuracy threshold is selected based on one or both of a weighted cost of erroneously making a decision to switch the radio resource control state, and a weighted cost of erroneously making decision not to switch the radio control state.

10. The node of claim 9, wherein the data transmission parameter comprises at least one of:
an inter-arrival time between bursts of data activity; and
a burst size of a burst of data activity.

11. The node of claim 9,
wherein the data transmission parameter comprises inter-arrival time between bursts of data activity, and
wherein the radio resource manager is configured to implement the state switch to a lower radio resource control state regardless of the prediction and the assessment when an elapsed time since the last burst of data activity exceeds a limit value.

12. The node of claim 9, wherein when the determination is not to implement the state switch, the radio resource manager is configured to make another prediction of the data transmission parameter and then to perform acts (2)-(3) with respect to the another prediction.

13. The node of claim 12, wherein the radio resource manager is configured to wait a predetermined time before making the another prediction but making the another prediction before a next data activity occurs.

14. The node of claim 12, wherein the radio resource manager is configured to use a first prediction technique to make the prediction of act (1) and to use a second prediction technique to make the another prediction.

15. The node of claim 9, wherein the radio resource manager is further configured to make the assessment regarding the probable accuracy of the prediction after making the prediction of the data transmission parameter so that the assessment confirms the prediction.

16. The node of claim 9, wherein the prediction of the data transmission parameter is prediction of the inter-arrival time to the next burst, the radio resource manager is further configured to make another prediction of the inter-arrival time to the next burst and then performing acts (2)-(3) with respect to the another prediction.

17. A method of operating a node of a radio access network configured to control radio resource control (RRC) states for a wireless terminal, the method comprising:
making, by the node, a prediction of a data transmission parameter upon a completion of a data activity associated with a wireless terminal, the data activity being a transfer of data between the wireless terminal and the node;
making, by the node, an assessment of an accuracy of the prediction by determining whether or not the probable accuracy of the prediction exceeds an accuracy threshold;

determining, by the node, whether a state switch should be implemented based on the assessment, the state switch comprising switching of the RRC state of the wireless terminal to a lower state; and implementing, by the node, the state switch when it is determined that the state switch should be implemented based on the assessment, wherein the accuracy threshold is set in relation to a cost of making an erroneous prediction such that higher accuracy threshold correlates to higher cost of the erroneous prediction.

18. The method of claim 17, wherein when it is determined that the state switch should be implemented based on the assessment, the state switch is implemented even when an elapsed time since a last burst of the data activity does not exceed a limit value.

19. The method of claim 17, further comprising:
determining whether an elapsed time since a last burst of the data activity exceeds a limit value; and
implementing the state switch when it is determined that the elapsed time exceeds the limit value,
wherein when it is determined that the elapsed time exceeds the limit value, the state switch is implemented even when it is determined that the state switch should not be implemented based on the assessment.

20. The method of claim 17,
wherein the act of making the prediction comprises making a first prediction of the data transmission parameter,
wherein the act of making the assessment comprises making a first assessment of the accuracy of the first prediction,
wherein the act of determining whether the state switch should be implemented based on the assessment comprises determining whether the state switch should be implemented based on the first assessment, and
wherein the method further comprises:
making a second prediction of the data transmission parameter when it is determined that that the state switch should not be implemented based on the first assessment;
making a second assessment of an accuracy of the second prediction; and
determining whether the state switch should be implemented based on the second assessment.

21. The method of claim 20, further comprising:
waiting a predetermined time period before performing the act of making the second prediction when it is determined that that the state switch should not be implemented based on the first assessment.

22. The method of claim 20,
wherein the act of making the first prediction comprises making the first prediction using a first prediction technique, and
wherein the act of making the second prediction comprises making the second prediction using a second prediction technique.

23. The method of claim 17, further comprising:
determining whether the state switch is warranted based on the prediction,
wherein the act of making the assessment of the accuracy of the prediction and the act of determining whether the state switch should be implemented based on the assessment are performed when it is determined that the prediction warrants the state switch.

24. The method of claim 23, further comprising:
determining whether an elapsed time since a last burst of the data activity does exceeds a limit value; and implementing the state switch when it is determined that the elapsed time does exceed the limit value,
wherein when it is determined that the elapsed time does exceed the limit value, the state switch is implemented even when it is determined that the prediction does not warrant the state switch.

25. The method of claim 17, wherein the act of making the prediction comprises predicting whether a time to next data activity will be longer or shorter than a specified value t.

26. The method of claim 25,
wherein in the act of making the prediction, it is predicted that the time to next data activity will be longer than the specified value t,
wherein the act of making the assessment comprises determining an accuracy probability, the accuracy probability being a probability of the prediction being accurate, and
wherein the act of determining whether the state switch should be implemented based on the assessment comprises determining that the state switch should be implemented when the accuracy probability exceeds an accuracy threshold.

27. A node of a radio access network configured to control radio resource control (RRC) states for a wireless terminal, the node comprising:
a resource manager configured to:
make a prediction of a data transmission parameter upon a completion of a data activity associated with a wireless terminal, the data activity being a transfer of data between the wireless terminal and the node,
make an assessment of an accuracy of the prediction by determining whether or not the probable accuracy of the prediction exceeds an accuracy threshold,
determine whether a state switch should be implemented based on the assessment, the state switch comprising switching of the RRC state of the wireless terminal to a lower state, and
implement the state switch when it is determined that the state switch should be implemented based on the assessment,
wherein the accuracy threshold is set in relation to a cost of making an erroneous prediction such that higher accuracy threshold correlates to higher cost of the erroneous prediction.

28. The node of claim 27, wherein when it is determined that the state switch should be implemented based on the assessment, the resource manager is configured to implement the state switch even when an elapsed time since a last burst of the data activity does not exceed a limit value.

29. The node of claim 27, wherein the resource manager is configured to:
make a first prediction of the data transmission parameter,
make a first assessment of the accuracy of the first prediction,
determine whether the state switch should be implemented based on the assessment based on the first assessment,
make a second prediction of the data transmission parameter when it is determined that that the state switch should not be implemented based on the first assessment,
make a second assessment of an accuracy of the second prediction, and
determine whether the state switch should be implemented based on the second assessment.

30. The node of claim 27, wherein the resource manager is configured to:
determine whether the state switch is warranted based on the prediction, and make the assessment of the accuracy of the prediction and determine whether the state switch should be implemented based on the assessment when it is determined that the prediction warrants the state switch.

31. The node of claim 27, wherein the resource manager is configured to:
predict that the time to next data activity will be longer than a specified value t,
determine an accuracy probability, the accuracy probability being a probability of the prediction being accurate, and
determine that the state switch should be implemented when the accuracy probability exceeds an accuracy threshold.

* * * * *

UNITED STATES PATENT AND TRADEMARK OFFICE
CERTIFICATE OF CORRECTION

PATENT NO. : 8,948,106 B2
APPLICATION NO. : 13/322982
DATED : February 3, 2015
INVENTOR(S) : Hannu et al.

It is certified that error appears in the above-identified patent and that said Letters Patent is hereby corrected as shown below:

On the Title Page, in Column 1, below Item (65), insert -- Related U.S. Application Data (60) Provisional of application No. 61/544,205, filed on Oct. 6, 2011. --, therefor.

On the Title Page, Item (56), under "OTHER PUBLICATIONS", in Column 2, Line 2, delete "Invormation" and insert -- Information --, therefor.

On Page 2, Item (56), under "OTHER PUBLICATIONS", in Column 2, Line 1, delete "et al," and insert -- et al., --, therefor.

In The Drawings:

In Fig. 1, Sheet 1 of 12, delete "ILDE" and insert -- IDLE --, therefor.

In Fig. 7B, Sheet 7 of 12, delete " 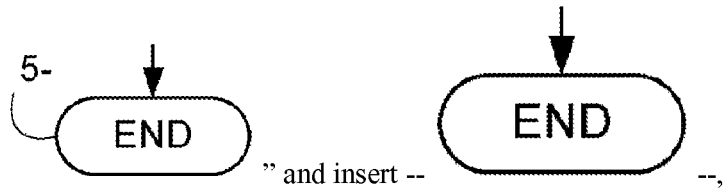 " and insert -- -- , therefor.

In The Specification:

In Column 1, Line 8, delete "reference." and insert -- reference U.S. Application No. 61/544,205, filed October 6, 2011. --, therefor.

In Column 2, Line 24, delete "streaming" and insert -- streaming. --, therefor.

In Column 3, Line 22, delete "61/544205," and insert -- 61/544,205, --, therefor.

Signed and Sealed this
Twenty-second Day of March, 2016

Michelle K. Lee
*Director of the United States Patent and Trademark Office*

CERTIFICATE OF CORRECTION (continued)
U.S. Pat. No. 8,948,106 B2

In The Specification:

In Column 3, Line 22, delete ""RADIO" and insert -- RADIO --, therefor.

In Column 3, Line 23, delete "SWITCHING," and insert -- SWITCHING," --, therefor.

In Column 6, Line 26, delete "parameter" and insert -- parameter. --, therefor.

In Column 6, Line 63, delete "thereof" and insert -- thereof. --, therefor.

In Column 10, Line 23, delete "at 5-2" and insert -- act 5-2 --, therefor.

In Column 10, Line 67, delete "to the" and insert -- to --, therefor.

In Column 11, Line 30, delete "Alim," and insert -- $A_{lim}$, --, therefor.

In Column 11, Line 56, delete "t before" and insert -- $t_{delta}$) before --, therefor.

In Column 11, Line 57, delete "(act" and insert -- act --, therefor.

In Column 12, Line 23, delete "classifer" and insert -- classifier --, therefor.

In Column 12, Line 29, delete "classifer" and insert -- classifier --, therefor.

In Column 12, Line 34, delete "where" and insert -- were --, therefor.

In Column 12, Line 36, delete "the a C4.5 classifer" and insert -- a C4.5 classifier --, therefor.

In Column 12, Line 60, delete "classifer" and insert -- classifier --, therefor.

In Column 12, Lines 61-62, delete "classifer" and insert -- classifier --, therefor.

In Column 14, Line 15, delete "the tdelta" and insert -- the --, therefor.

In Column 14, Line 40, delete "down-switch" and insert -- down-switch. --, therefor.

In The Claims:

In Column 16, Line 7, in Claim 9, delete "determining" and insert -- by determining --, therefor.

In Column 16, Line 18, in Claim 9, delete "making" and insert -- making a --, therefor.

In Column 16, Line 19, in Claim 9, delete "radio" and insert -- radio resource --, therefor.

In Column 17, Line 38, in Claim 20, delete "that that" and insert -- that --, therefor.

CERTIFICATE OF CORRECTION (continued)
U.S. Pat. No. 8,948,106 B2

In The Claims:

In Column 17, Line 48, in Claim 21, delete "that that" and insert -- that --, therefor.

In Column 18, Line 57, in Claim 29, delete "that that" and insert -- that --, therefor.